Figure 1:
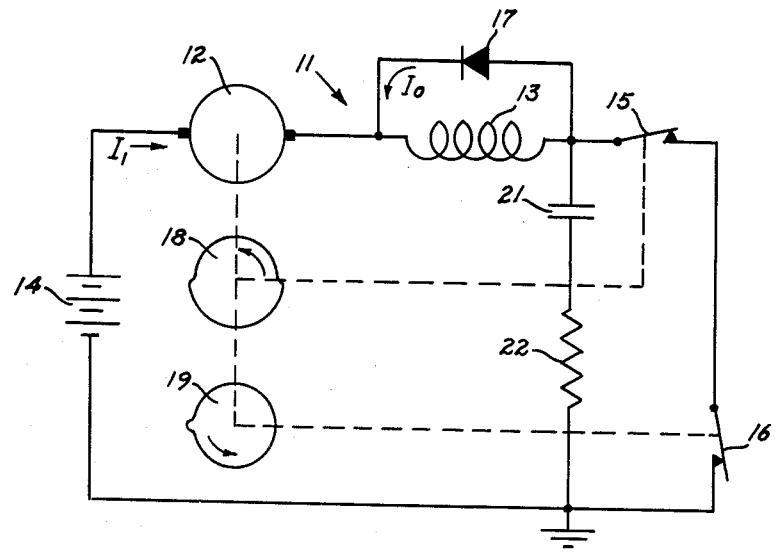

INVENTORS
JOHN A. FICEK
FRANCIS A. WISSEL
BY
*H. H. Loeb*
*Paul S. Collignon*
ATTORNEYS 3,181,048
MOTOR DRIVE SYSTEM FOR A
CONTROL CIRCUIT
John A. Ficek, Worthington, and Francis A. Wissel, Montgomery, Ohio, assignors, by mesne assignments, to the United States of America as represented by the Secretary of the Navy
Filed June 26, 1961, Ser. No. 119,749
3 Claims. (Cl. 318—246)

The present invention relates to an improved motor drive system for a control circuit and more particularly to a drive system that eliminates the arcing of switches and provides a reduction in noise generation and fire hazards.

Motor driven indexing switches are frequently used for remote control operations, however, these switches generate serious radio interference because of inductive arcover during their running period. This undesirable characteristic of arcing presents a serious explosion hazard, particularly in military equipment such as missiles and the like. Also, another serious aspect arises when a switch circuit is opened, that is, a very high impedance input is presented to the electronic circuitry which may introduce serious error information, or even damage the electronic equipment.

Heretofore, the severity of arcing has been reduced by the incorporation of damping circuits. However, these damping circuits often provide additional conditions that cannot be tolerated in precision equipment. Another heretofore known method of reducing arcing has been by the use of decay circuits that extend the current decay time in a motor or solenoid field. This decay condition cannot, however, be tolerated in many electronic applications.

The present invention provides a unique method of reducing the arcing caused by the opening of a control circuit switch by cutting off the power source from the control circuit before the control circuit switch is actuated. After the power source is removed from the motor drive, the stored energy in the field of the motor is used to continue the motor drive for the completion of the switching action. The motor circuit switch can be opened after about sixty percent of the total drive travel and the stored field energy is dissipated in the correct direction to continue the torque on the drive motor. A semiconductor branch is shunted across the field winding of the motor drive, and the energy in the field winding that would produce arcing is bypassed through the semiconductor branch in the proper direction to continue the motor drive force. Thus it can be seen that the system increases the efficiency of the system and eliminates arcing as well.

It is therefore a general object of the present invention to eliminate arcing during the opening of a control circuit switch.

Another object of the present invention is to reduce radio interference and explosion hazards in a switching circuit.

Still another object of the present invention is to increase the efficiency in a motor drive system.

A further object of the present invention is to provide means for using the stored circuit energy in a field winding to extend the power drive of a motor.

Figure 2:
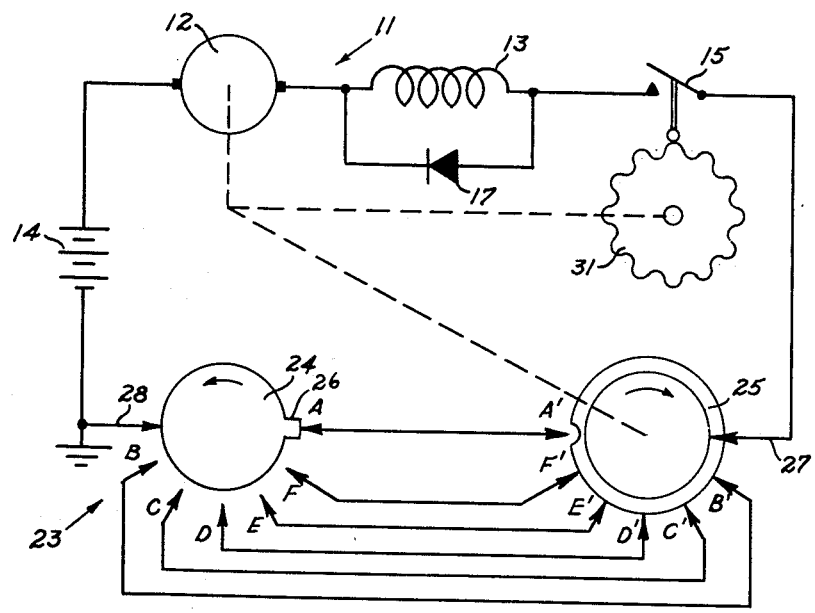

Other objects and advantages of the present invention will be readily appreciated as the same becomes better understood by reference to the following detailed description when considered in connection with the accompanying drawing wherein:

FIG. 1 is a schematic diagram showing a general embodiment of the present invention; and FIG. 2 is a schematic diagram showing a specific embodiment of the present invention.

Referring now to the drawing, wherein like reference characters designate like or corresponding parts throughout the views, there is shown in FIG. 1 a drive motor 11 having a rotor 12 and field winding 13. The drive motor 11 is connected to a suitable power source 14 through a motor switch 15 and a control circuit switch 16, that is to be actuated with a minimum amount of arcing. A semiconductor 17, such as a silicon diode, is shunted across the field winding 13 such that when current is flowing in the semiconductor branch the flow will continue to drive the rotor 12. Cams 18 and 19, which are rotatably connected to the rotor 12, are provided for actuating switches 15 and 16, respectively. As can be seen, cams 18 and 19 are oriented such that motor switch 15 is actuated before the control circuit switch 16 is actuated. A capacitor 21 and resistor 22 are shunted across the two switches 15 and 16, and the very small amount of energy remaining in the field winding 13 when switch 16 is opened, is dissipated through the branch containing the capacitor, resistor, and power source 14.

In operation, when motor switch 15 and control circuit switch 16 are closed, drive motor 11 is energized by power source 14 and rotor 12 is rotated. Cams 18 and 19, which are connected to rotor 12, are likewise rotated, and cam 18 first opens motor switch 15. With switch 15 opened, current $I_0$ flows in the semiconductor branch to continue the drive of rotor 12 until cam 19 actuates the control circuit switch 16. Any remaining energy in field winding 13 is dissipated through capacitor 21, resistor 22, and battery 14, and thus any arcing of switch 16 is eliminated.

Referring now to FIG. 2 of the drawing, there is shown a specific embodiment of the present invention which includes a multiple position switch 23, which by way of example, has two decks and six positions. Deck 24, which is positioned by hand or other means, determines the degree of travel of deck 25, which is driven by rotor 12. For example, when deck 24 is rotated 210 degrees in a counterclockwise direction from the position shown, so that contact 26 engages terminal B, deck 25 is rotated 210 degrees by rotor 12 in a clockwise direction to position B', at which position the circuit between conductors 27 and 28 is opened. Cam 31 which intermittently opens motor switch 15 is likewise driven by rotor 12. As switch 15 is opened, the stored energy in field winding 13 is passed through diode 17 to continue the rotation of rotor 12. By way of example, switch 15 is closed for 15 degrees of rotation of rotor 12 and then remains open for an additional 15 degrees of rotation of rotor 12 due to the electrical and mechanical flywheel action of the motor 11. Switch 15 continues to be closed and opened until deck 25 is rotated to a desired position dictated by deck 24, at which time the circuit is opened and rotation of rotor 12 is stopped. The intermittent opening of switch 15 prevents the stored energy in field winding 13 from reaching a high value, as this energy is constantly being drained off to drive rotor 12. Thus when switch 23 opens between conductors 27 and 28 the amount of arcing is a minimum, as the energy in field winding 13 has been dissipated.

It can thus be seen that the present invention provides an economical and feasible way of eliminating arcing when a switch is opened.

Obviously many modifications and variations of the present invention are possible in the light of the above teachings. It is therefore to be understood, that within the scope of the appended claims, the invention may be practiced otherwise than as specifically described.

What is claimed is:

1. In a motor drive system operating a control circuit, a power source, a motor having a series field winding and a rotor, a motor switch and a control circuit switch connected in series with said power source, said rotor and said field winding, first means connected to said rotor for intermittently opening said motor switch, means shunted across said field winding for using the stored energy in said field winding to drive said rotor during periods of interruption of said power source, and second means connected to said rotor for opening said control circuit switch after said motor switch has been actuated a predetermined number of times and opening only when said motor switch is in the open position.

2. In a motor drive system operating a control circuit as set forth in claim 1 wherein said first means connected to said rotor for intermittently opening said motor switch comprises a cam connected to said rotor.

3. In a motor drive system operating a control circuit as set forth in claim 1 wherein said means shunted across said field winding is a diode.

References Cited by the Examiner
UNITED STATES PATENTS

| | | | |
|---|---|---|---|
| 1,091,256 | 3/14 | Thomas | 318—251 |
| 2,746,006 | 5/56 | Hill | 317—11.4 |
| 3,007,100 | 10/61 | Bettcher | 318—527 |

MILTON O. HIRSHFIELD, *Examiner.*

ORIS L. RADER, *Primary Examiner.*